United States Patent [19]
Cognaco

[11] 3,905,993
[45] Sept. 16, 1975

[54] CHLORINATED DERIVATIVES OF 1-(2-Δ²-IMIDAZOLINYL)-2,2-DIARYLCYCLOPROPANES

[75] Inventor: Jean-Claude Cognaco, Garches, France

[73] Assignee: Societe Anonyme dite: Hexachime, Rueil Malmaison, France

[22] Filed: Nov. 23, 1973

[21] Appl. No.: 418,178

[30] Foreign Application Priority Data
Nov. 30, 1972 United Kingdom............... 55278/72
Feb. 6, 1973 United Kingdom................. 5774/73

[52] U.S. Cl. .......... 260/309.6; 260/465 G; 424/273
[51] Int. Cl............................................. C07d 49/34
[58] Field of Search .................................. 260/309.5

[56] References Cited
OTHER PUBLICATIONS
Chem. Abstracts, 78:111312H.

*Primary Examiner*—Ethel G. Love
*Attorney, Agent, or Firm*—Bacon & Thomas

[57] ABSTRACT

This invention relates to chlorinated derivatives of 1-(2-Δ²-imidazolinyl)-2,2-diarylcyclopropanes and their acid addition salts as new industrial products, to the process for their preparation and to their therapeutic application such as anti-inflammatory and anti-arrhythmic agents.

4 Claims, No Drawings

CHLORINATED DERIVATIVES OF 1-(2-Δ²-IMIDAZOLINYL)-2,2-DIARYLCYCLOPROPANES

The new compounds according to the invention are selected from the group comprising:

a. compounds corresponding to the general formula

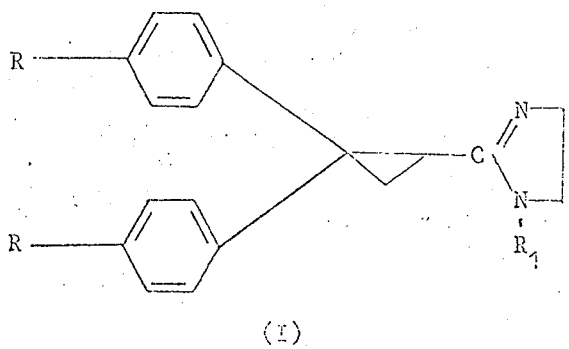

(I)

in which $R_1$ represents the hydrogen atom, the benzyl group or a monochlorinated or polychlorinated benzyl group, and R represents the chlorine atom and can represent hydrogen when $R_1$ contains at least one chlorine atom, and b. their acid addition salts.

The compounds of formula I all show anti-inflammatory properties, whilst some of them also show anti-arrhythmic properties that can be utilised for the treatment of cardiovascular disorders.

The compounds of formula I are prepared from a 1-cyano-2,2-diarylcyclopropane corresponding to the formula

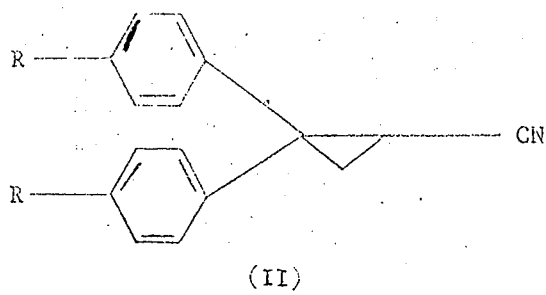

(II)

in which R is as defined above, by a process distinguished by the fact that:

a. the nitrile of formula II is reacted with ethylene diamine monotosylate

$$H_2N\text{-}CH_2\text{-}CH_2\text{-}NH_2, \; p\text{-}CH_3\text{-}C_6H_4\text{-}SO_3H \qquad (III)$$

b. if necessary, the compound thus obtained which corresponds to the formula

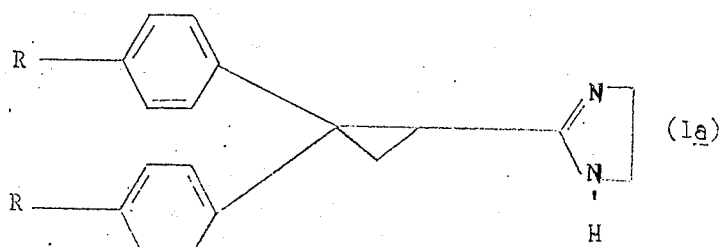

(Ia)

is subjected to a metallation reaction and the metallic derivative thus formed reacted with a halide corresponding to the formula

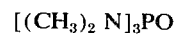

$R_1$—Hal  (IV)

in which Hal is a halogen atom and $R_1$ is different from the hydrogen atom, to form a compound of formula I in which $R_1$ is different from the hydrogen atom.

In a preferred embodiment, the reaction of nitrile II with ethylene diamine monotosylate is carried out at 200°C without any need for a solvent; instead the reaction is simply carried out in an excess of ethylene diamine monotosylate, for example 2 moles of ethylene diamine monotosylate per mole of nitrile II.

In another preferred embodiment, the metallation reaction is carried out by means of the compound selected from a group comprising sodium hydride and organolithium compounds of the formula $R_2Li$ where $R_2$ is a $C_1$-$C_5$ alkyl group or phenyl.

In a preferred embodiment, the metallation of a compound Ia with NaH can be carried out in hexamethyl phosphortriamide which is also known as hexametapol or HMPT and which corresponds to the formula $$[(CH_3)_2 N]_3 PO$$

This reaction takes place at around 90°C over a period of about 6 hours.

In another preferred embodiment, the metallation of a compound Ia with $R_2Li$ can be carried out in an inert solvent over a period of about 1 to 3 hours at a temperature of from 15° to 25°C. In this case, it is possible to use a slight excess of organolithium compound, namely 1.1 to 1.2 moles of $R_2Li$ per mole of Ia, the preferred organolithium compound being butyl lithium. Among the inert solvents that can be used for metallation with $R_2Li$, reference is made in particular to aliphatic and aromatic hydrocarbons, ethers and tetrahydrofuran. The preferred solvents for this reaction are hexane, benzene, toluene, xylene, diethylether and tetrahydrofuran.

The acid addition salts of the compounds of formula I are obtained by reaction with a mineral or organic acid by a method known per se. Acids suitable for this purpose include in particular hydrochloric acid, sulphuric acid, phosphoric acid, oxalic acid, succinic acid, methane sulphonic acid, cyclohexyl sulphamic acid, formic acid, aspartic acid, glutamic acid, N-acetyl aspartic acid, N-acetyl glutamic acid, ascorbic acid, maleic acid, malic acid, fumaric acid, lactic acid, benzoic acid, cinnamic acid, p-toluene sulphonic acid.

The compounds according to the invention can be used in therapeutic compositions intended in particular for the treatment of inflammation and pain, being distinguished by the fact that they contain at least one compound of formula I or one of its non-toxic acid addition salts in association with a physiologically acceptable excipient.

Other advantages and features of the invention will be apparent from the following examples in which Example 1 relates to the preparation of a nitrile of formula II, Example 2 relates to the synthesis of a compound Ia according to the invention, Examples 3 and 4 relate to the metallation technique using NaH whilst Examples 5 and 6 relate to the metallation technique using an organolithium compound.

EXAMPLE 1

1-Cyano-2,2-di-p-chlorophenyl cyclopropane (Formula II; R = Cl)

0.55 mole of acrylonitrile are added dropwise to a solution of 0.5 mole of di-p-chlorophenyl diazomethane in 500 cc of ether. The mixture is then stirred at around 30°C. The evolution of nitrogen is over after 5 hours. The solvent is evaporated and the residue distilled in vacuo.

| | b.p. (1 mm Hg): 200 – 205°C | m.p. 139°C |
|---|---|---|
| Yield 57 % | | |
| Analysis: Cl % | calculated 24.3 | N % calculated 4.85 |
| | found 24.4 | found 4.90 |

EXAMPLE 2

1-(2-$\Delta^2$-imidazolinyl)-2,2-di-p-chlorophenyl cyclopropane (Formula I; R = Cl, $R_1$ = H)

A mixture of 0.5 mole of 1-cyano-2,2-di-p-chlorophenyl cyclopropane and 1 mole of ethylene diamine monotosylate III is heated progressively to 200°C and kept at this temperature for a period of 2 hours. The mixture is then allowed to cool and taken up in 1.2 moles of sodium hydroxide in 400 cc of water, followed by the addition of 200 cc of chloroform. The chloroform is decanted and the aqueous phase reextracted with 100 cc of chloroform.

The product is dried over sodium sulphate and the chloroform removed in vacuo.

Preparation of the hydrochloride

The residue left following evaporation of the chloroform as described above is taken up in 200 cc of isopropanol, followed by the addition of ethyl chloride up to pH 1 and then by the addition of 50 cc of ether. The product is then triturated. It crystallises, is filtered and dried, followed by recrystallisation from 90 % isopropanol.

| Yield | 54 % | m.p. 295°C (decomposition) |
|---|---|---|
| Analysis: | N % | calculated 7.62 |
| | | found 7.51 |

EXAMPLE 3

1-[2-(N-p-chlorobenzyl)-$\Delta^2$-imidazolinyl]-2,2-diphenyl cyclopropane (Formula I; R = H, $R_1$=p-Cl $C_6H_4CH_2$)

A solution of 0.12 mole of 1-(2-$\Delta^2$-imidazolinyl)2,2-diphenyl cyclopropane, prepared by the method described in Example 2, in 50 cc of hexamethyl phosphortriamide is added dropwise with stirring to 0.1 mole of sodium hydride in 20 cc of hexamethyl phosphortriamide heated to 90°C. On completion of the addition, the mixture is stirred for 6 hours at 90°C. It is then cooled in an ice bath, followed by the dropwise addition, at a temperature kept at around 25°C, of 0.12 mole of p-Cl-$C_6H_4CH_2Cl$. After the heat effect has abated, the reaction medium is stirred for 2 hours at room temperature (15° to 25°C). It is then poured onto 300 cc of water, extracted with ether, dried over magnesium sulphate and the ether removed.

Preparation of the hydrochloride

The evaporation residue is taken up in 50 cc of ether, ethyl chloride added up to pH 1, followed by trituration. After crystallisation, the product is filtered, washed with ether and dried and then recrystallised from a mixture of isopropanol and ether (70 : 30).

The product obtained has the following characteristics:

| Yield | 45 % | m.p. 201 – 203°C |
|---|---|---|
| Analysis: | N % | calculated 6.6 |
| | | found 6.4 |

EXAMPLE 4

1-[2-(N-benzyl)-$\Delta^2$-imidazolinyl]-2,2-di-p-chlorophenyl cyclopropane (Formula I; R = Cl, $R_1$ = $C_6H_5CH_2$)

The procedure is as in Example 3, except that the 1-(2-$\Delta^2$-imidazolinyl)-2,2-diphenyl cyclopropane is replaced by 1-(2-$\Delta^2$-imidazolinyl)-2,2-di-p-chlorophenyl cyclopropane (0.1 mole), prepared by the method described in Example 2, and the p-Cl-$C_6H_4CH_2Cl$ by an equivalent quantity of $C_6H_5CH_2Cl$.

Preparation of the hydrochloride

The hydrochloride prepared as described in Example 3 has the following characteristics:

| Yield | 30 % | m.p. 250°C |
|---|---|---|
| Analysis: | N % | calculated 6.11 |
| | | found 6.24 |

EXAMPLE 5

1-[2-(N-p-chlorobenzyl)-$\Delta^2$-imidazolinyl]-2,2-diphenyl cyclopropane (Formula I; R = H, $R_1$=p-Cl $C_6H_4CH_2$)

0.11 mole (44 cc) of a 2.5 M butyl lithium solution in hexane is added at a temperature kept at around 20°C to 0.1 mole of 1-[2-$\Delta^2$-imidazolinyl]-2,2-diphenyl cyclopropane in 100 cc of anhydrous benzene, and the mixture stirred for 2 hours at ambient temperature (15° to 25°C). 0.12 mole of p-chlorobenzyl chloride is added dropwise to the reaction mixture at a temperature kept at around 25°C. The reaction mixture is then stirred at room temperature until it is homogeneous (which takes about 2 hours), and is then heated under reflux for 3 hours. After cooling, 100 cc of water are added and the mixture stirred for 10 minutes, decanted, extracted with 200 cc of ether, dried over magnesium sulphate and the solvent evaporated in vacuo.

Preparation of the succinate

The evaporation residue is taken up in 150 cc of ethanol, heated under reflux and 0.1 mole of succinic acid added while stirring. After cooling, 150 cc of ether are added and the product left standing for 2 hours, after which it is filtered, dried and recrystallised from a mixture of isopropanol and ether (80 : 20).

| Yield | 71 % | m.p. 126°C |
| --- | --- | --- |
| Analysis: | N % | calculated 5.55 |
| | | found 5.51 |

EXAMPLE 6

1-[2-(N-benzyl)-$\Delta^2$-imidazolinyl]-2,2-di-p-chlorophenyl cyclopropane (Formula I; R = Cl, $R_1$ = $C_6H_5CH_2$)

The procedure is as in Example 5, except that the 1-(2-$\Delta^2$-imidazolinyl)-2,2-diphenyl cyclopropane is replaced by 1-(2-$\Delta^2$-imidazolinyl)-2,2-di-p-chlorophenyl cyclopropane (0.1 mole), and the p-chlorobenzyl chloride by benzyl chloride (0.12 mole).

Preparation of the hydrochloride

The evaporation residue is taken up in 200 cc of acetone, ethyl chloride added with stirring up to pH 1 and the product left standing for 3 hours, after which it is filtered, washed with acetone and dried.

| Yield | 67 % | m.p. 250°C |
| --- | --- | --- |
| Analysis: | N % | calculated 6.11 |
| | | found 6.17 |

The results of pharmacological tests carried out with the products of Examples 2, 3 and 4 are summarised in the following.

I - Anti-inflammatory activity

1. Method

Groups of 12 male SPF rats (OFA strain) weighing 120 to 130 g are given the products to be tested orally 2 hours and 30 minutes (half the dose each time) before the subcutaneous plantar injection of 0.05 ml of a 1 percent carrageenin solution. The volume of the rear paw into which the phlogogenic agent has been injected is measured at regular intervals. The effective dose 50 ($DE_{50}$) is calculated at the acme of the phenomenon in the controls. The following Tables show the percentage inhibition levels at different times. 2. The results are set out in Table I below.

TABLE I

| mg/kg VO | Example 2 | | | Example 3 | | | Example 4 | | |
| --- | --- | --- | --- | --- | --- | --- | --- | --- | --- |
| | 1 h | 3 h | 4 h 30 | 1 h | 3 h | 4 h 30 | 1 h | 3 h | 4 h 30 |
| 8 | 13 | 33 | 41 | 29 | 25 | 31 | 33 | 29 | 20 |
| 16 | 24 | 43 | 64 | 47 | 37 | 48 | 26 | 26 | 18 |
| 32 | 43 | 54 | 69 | 57 | 45 | 56 | 70 | 50 | 45 |
| 64 | 72 | 65 | 80 | 63 | 64 | 73 | 95 | 78 | 58 |
| 128 | 100 | 87 | 82 | 93 | 91 | 93 | 79 | 85 | 80 |
| $DE_{50}$ | 13 mg/kg VO | | | 20 mg/kg VO | | | 47 mg/kg VO | | |

II - Anti-hyrthermal activity

1. Method

Groups of 6 male SPF rats (OFA strain) weighing 150 to 180 g are sub-cutaneously injected with a 12 percent solution of brewer's yeast. The products to be tested are administered 2 hours later. Temperature is measured every hour for 6 hours. The following Table shows the percentage inhibition of the reaction at the thermal peak of the controls. 2. The results are set out in Table II below.

TABLE II

| mg/kg VO | Example 2 | Example 3 | Example 4 |
| --- | --- | --- | --- |
| 8 | — | 22 | 36 |
| 16 | 14 | 36 | 30 |
| 32 | 35 | 43 | 30 |
| 64 | 62 | 43 | 53 |
| 128 | 64 | 36 | 65 |
| 256 | 83 | — | — |
| $DE_{50}$ | 60 mg/kg VO | >128 mg/kg VO | 60 mg/kg VO |

III - Antalgic activity

1. Method

The products to be treated are administered orally to groups of 6 male mice ($SPF_1$, strain $OF_1$) weighing 19 to 20 g.

1 hour later, the mice are injected intraperitoneally with 0.3 ml of a 0.02 percent phenyl benzoquinone solution, and the number of painful reactions (writhing of the abdomen) is counted from the 5th to the 10th minute after this treatment.

The following Table shows the percentage inhibition of these reactions.

2. The results are set out in Table III below.

TABLE III

| mg/kg VO | Example 2 | Example 3 | Example 4 |
| --- | --- | --- | --- |
| 8 | — | — | 29 |
| 16 | 39 | 28 | 43 |
| 32 | 49 | 36 | 64 |
| 64 | 74 | 53 | 75 |
| 128 | 79 | 83 | |
| $DE_{50}$ | 26 mg/kg VO | 45 mg/kg VO | 20 mg/kg VO |

IV - Ulcerogenic activity

1. Method

Groups of 6 male rats are put on a diet of water 18 hours before the test. The products to be tested are orally administered. 6 hours later, the stomachs of the rats are removed and examined under a binocular microscope for signs of ulceration.

2. Results

The products of Examples 2, 3 and 4 do not cause any change visible under a microscope in the gastric mucous in oral doses of 128 to 152 mg/kg.

It can be seen from these various test that the products of Examples 2, 3 and 4 show interesting antiinflammatory properties. The clinical tests carried out verified the indications relating to the treatment of inflammation which had been envisaged on the basis of the pharmacological tests.

The product of Example 2 in particular, administered in the form of capsules containing 200 mg of active principle or in the form of suppositories containing 300 mg of active principle, produced a reduction and even suppression of pulmonary, post-traumatic, haemorrhoidal and vascular inflammation. A pediatric suspension containing 20 mg of active principle in 5 ml of a conventional vehicle reduced and even suppressed pulmonary inflammation arising out of an infection. A 5 percent ointment has an anti-inflammatory effect both on post-traumatic oedema and on superficial venous inflammation. The product of Example 2 has remarkable gastric tolerance.

I claim:

1. Chlorinated 1-(2-$\Delta^2$-imidazolinyl)-2,2-diarylcyclopropanes selected from the group comprising:

a. compounds corresponding to the general formula

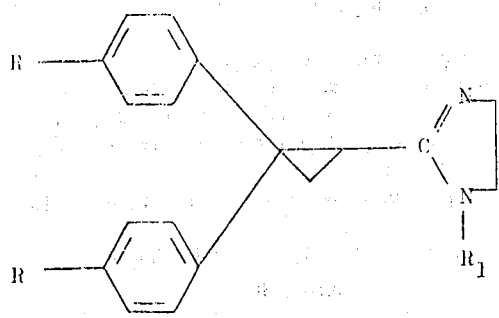

(1)

in which $R_1$ represents the hydrogen atom, the benzyl group or a monochlorinated or polychlorinated benzyl group, and R represents the chlorine atom and, where $R_1$ contains at least one chlorine atom, can represent hydrogen; and b. their pharmaceutically acceptable acid addition salts.

2. 1-(2-$\Delta^2$-imidazolinyl)-2,2-di-p-chlorophenyl cyclopropane and its pharmaceutically acceptable acid addition salts.

3. 1-[2-(N-p-chlorobenzyl)-$\Delta^2$-imidazolinyl]-2,2-diphenyl cyclopropane and its pharmaceutically acceptable acid addition salts.

4. 1-[2-(N-benzyl)-$\Delta^2$-imidazolinyl]-2,2-di-p-chlorophenyl cyclopropane and its pharmaceutically acceptable acid addition salts.

* * * * *